United States Patent
Ohmi et al.

[11] Patent Number: 5,837,907
[45] Date of Patent: Nov. 17, 1998

[54] METHOD OF TIGHTENING THREADED MEMBERS

[75] Inventors: Tadahiro Ohmi, Sendai; Eiji Ideta, Osaka; Hiroyuki Fukuda, Osaka; Keiji Hirao, Osaka; Tsutomu Shinohara, Osaka; Michio Yamaji, Osaka; Hiroshi Morokoshi, Osaka; Tetsuya Kojima, Osaka, all of Japan

[73] Assignee: Fujikin Incorporated, Osaka, Japan

[21] Appl. No.: 862,292

[22] Filed: May 22, 1997

[51] Int. Cl.⁶ .................................................. G01L 3/06
[52] U.S. Cl. .......................................... 73/862.23; 702/41
[58] Field of Search ........................... 73/862.21, 862.23, 73/862.24, 761; 364/508

[56] References Cited

U.S. PATENT DOCUMENTS

| | | | |
|---|---|---|---|
| 3,965,778 | 6/1976 | Aspers et al. | 81/52.4 R |
| 4,081,037 | 3/1978 | Johnson | 173/1 |
| 4,446,745 | 5/1984 | Stone et al. | 73/862.25 |
| 4,959,797 | 9/1990 | McIntosh | 364/508 |
| 5,154,242 | 10/1992 | Soshin et al. | 73/862.23 |
| 5,229,931 | 7/1993 | Takeshima et al. | 364/133 |
| 5,402,688 | 4/1995 | Okada et al. | 73/862.23 |

FOREIGN PATENT DOCUMENTS

| | | |
|---|---|---|
| 2 317 999 | 2/1977 | France . |
| 58-056739 | 4/1983 | Japan . |
| 59-053133 | 3/1984 | Japan . |
| 7-100715 | 4/1995 | Japan . |
| 97/10928 | 3/1997 | WIPO . |

Primary Examiner—Ronald L. Biegel
Attorney, Agent, or Firm—Armstrong, Westerman, Hattori, McLeland & Naughton

[57] ABSTRACT

A method is provided for tightening up threaded members with proper tightening torque free of unequivalent tightening. In tightening a plurality of threaded members by drive means, the amount of tightening and tightening torque of each threaded member are detected as the members are progressively tightened, and when the tightening amount of each member has reached a value within a specified range, the difference in tightening torque between the threaded members is checked as to whether it is within a predetermined range.

11 Claims, 9 Drawing Sheets

METHOD OF TIGHTENING THREADED MEMBERS

BACKGROUND OF THE INVENTION

The present invention relates to a threaded member tightening method of simultaneously tightening a plurality of threaded members such as hexagon socket head bolts, hexagon head bolts and nuts, and more particularly, to a method of tightening threaded members, which method is suitable for tightening threaded members for installing, for example, massflow controllers which are to be provided in gas control apparatus for fabricating semiconductors and which must be held highly gastight.

Controllers, such as massflow controllers which are provided in such gas control apparatus for fabricating semiconductors and which need to be given high air- or gastightness, include a member fastened to a base plate with four bolts having a hexagon socket head and arranged on one side of the member, usually with a gasket or like seal, disposed between the butting faces. If the bolt tightening torque is too weak, a faulty seal will result, whereas excessive torque deforms the gasket to entail an improper seal, so that each bolt needs to be tightened up with proper torque. Further, if one bolt only is tightened with a greater force than the other bolts to result in uneven fastening, the gasket will be deformed to produce a faulty seal. The bolts must therefore be tightened equivalently. In installing the massflow controller, accordingly, the following tightening method is used. The bolts are first tightened manually, and one of the four bolts is then tightened with a wrench by a fraction of the required or specified amount of tightening. Next, the second bolt, which is positioned diagonally of the first bolt, is tightened by the same amount, the third bolt adjacent to the second bolt is subsequently tightened by the same amount, the fourth bolt positioned diagonally of the third bolt is tightened by the same amount, and the first bolt is thereafter tightened to repeat the same procedure as above. Thus, the bolts are tightened equivalently by a small amount at a time and eventually screwed up by the specified amount.

The following problems are encountered in the conventional method of tightening threaded members using a wrench for hexagon head bolts.

1. The work of turning the bolts individually by a small amount at a time is cumbersome.

2. The amount the bolt is tightened at a time, if increased, facilitates the tightening work but increases the possibility of deforming the gasket by uneven fastening, hence increased likelihood of making the seal faulty.

3. Although the angle through which the bolt is to be rotated by the wrench after manual tightening is predetermined, the accuracy of the angle of rotation is insufficient because of the manual work involved. This entails the likelihood that the bolt will not be tightened up by the proper amount to cause a fault in the seal.

SUMMARY OF THE INVENTION

An object of the present invention is to provide a method of tightening threaded members, for example, for use in installing a massflow controller which is to be provided for a gas control apparatus for producing semiconductors and which needs to be held highly gastight, the method being adapted to tighten threaded members with proper torque without necessitating the cumbersome procedure of rotating the threaded members one by one through a specified small angle at a time and free of the likelihood of producing a faulty seal.

The present invention provides a method of tightening a plurality of threaded members by drive means, the method being characterized by tightening each of the threaded members while detecting the amount of tightening of the threaded member and the tightening torque thereof, stopping tightening upon the amount of tightening of each threaded member reaching a specified value based on the time required for the tightening torque to reach a predetermined value, and judging each threaded member to be properly tightened when the tightening torque of a threaded member is within a predetermined range, with the difference in tightening torque between the threaded members being maintained within a predetermined range.

The threaded member tightening method of the invention assures that each of the threaded members, as tightened is at a proper absolute level by judging that the tightening torque of the threaded member is within a predetermined range upon the amount of tightening (e.g., the number of revolutions) of the threaded member reaching a specified value. The method further assures that the threaded members are equivalently tightened by judging whether the difference in tightening torque between the threaded members is within a predetermined range. Consequently, only when the absolute level of each threaded member is within the specified limits without giving rise to unequivalent tightening or uneven fastening, the threaded members are judged to be properly tightened and can therefore be tightened at the same time. Accordingly, the threaded members can be tightened with proper tightening torque without necessitating the cumbersome procedure of rotating the threaded members one by one by a small amount at a time, with uneven fastening precluded.

The specified value for the amount of tightening is smaller than a proper value for the final amount of tightening. Preferably, the control means for the method has main tightening means for finally tightening each threaded member to the proper value when the threaded member is judged to be properly tightened. Faults in tightening can then be detected early to discontinue the tightening operation before the seal member, for example, is broken.

The present invention provides a method of tightening a plurality of threaded members by drive means, the method being characterized by tightening each of the threaded members while detecting the amount of tightening of the threaded member and the tightening torque thereof, stopping tightening upon the tightening torque of each threaded member reaching a predetermined value with the amount of tightening within a specified range, and judging each threaded member to be properly tightened when the difference in tightening amount between the threaded members is within a specified range.

The threaded member tightening method of the invention assures that each of the threaded members as tightened is at a proper absolute level, by completing tightening upon the tightening torque of the threaded member reaching a predetermined value with the amount of tightening within a specified range. The method further ensures that the threaded members are tightened equivalently by judging whether the difference in tightening torque between the threaded members is within a predetermined range. Consequently, only when the absolute level of each threaded member is within the specified limits without giving rise to unequivalent tightening or uneven fastening, the threaded members are judged to be properly tightened and can therefore be tightened at the same time. Accordingly, the threaded members can be tightened with proper tightening torque without necessitating the cumbersome procedure of rotating the threaded members one by one by a small amount at a time, with uneven fastening precluded.

The predetermined value for the tightening torque is smaller than a proper value for final tightening torque. Preferably, the control means for the method further comprises main tightening means for tightening each threaded member until the proper final torque value is reached when the threaded member is judged to be properly tightened. Faults in tightening can then be detected early to discontinue the tightening operation before the seal member, for example, is broken.

The number of threaded members to be tightened by the method described above may be two, three or at least four. A plurality of threaded members may be rotated all at the same time, one by one, or two of them at a time. The cumbersome work of rotating at least two threaded members one by one by a small amount at a time can be eliminated by rotating these threaded members at the same time.

When a plurality of threaded members are to be tightened up at the same time, all the threaded members are tightened at the same time. When the tightening torque on one of the members has reached the predetermined value with the tightening amount within the specified range, it is desired to stop tightening the member at this moment. This obviates the likelihood that one of the threaded members will be overtightened, making it possible to tighten the threaded members more equivalently.

When at least four threaded members are to be tightened, it is desired to divide these threaded members into sets of at least two and to tighten each of the sets by the method described. At least four threaded members can then be tightened up by using the tightening method employed for tightening two threaded members at the same time. This permits use of a simpler judging or checking program than when at least four threaded members are tightened at the same time.

When four threaded members are to be tightened, it is desired to divide these threaded members into a set of two members positioned diagonally and a set of two members positioned diagonally reversely. At this time, the threaded members are tightened preferably by pretightening two diagonally positioned members by a specified amount first, then pretightening the other two members positioned diagonally reversely by a specified amount, thereafter rotating the first two members to a specified final range for main tightening and finally rotating the other two members to a specified final range for main tightening. In this way, the threaded members can be progressively tightened up more equivalently than when the first two members are tightened up to the final extent at a time.

It is desired that a judgment of abnormality be made to discontinue tightening upon the tightening torque of one of the threaded members exceeding the predetermined value before the amount of tightening of the threaded member reaches a specified lower limit. It is also desired to make a judgment of abnormality to discontinue tightening when the tightening torque of one of the threaded members is below the predetermined value even if the amount of tightening of the threaded member reaches a specified upper limit.

Furthermore, the tightening operation may be divided into a plurality of steps, each of which is executed by the threaded member tightening method described.

DESCRIPTION OF THE PREFERRED EMBODIMENTS

Embodiments of the invention will be described below with reference to the drawings. In the following description, the term "forward end" refers to an end closer to the threaded member to be tightened, and the term "base end" to the other end.

Figure 1:
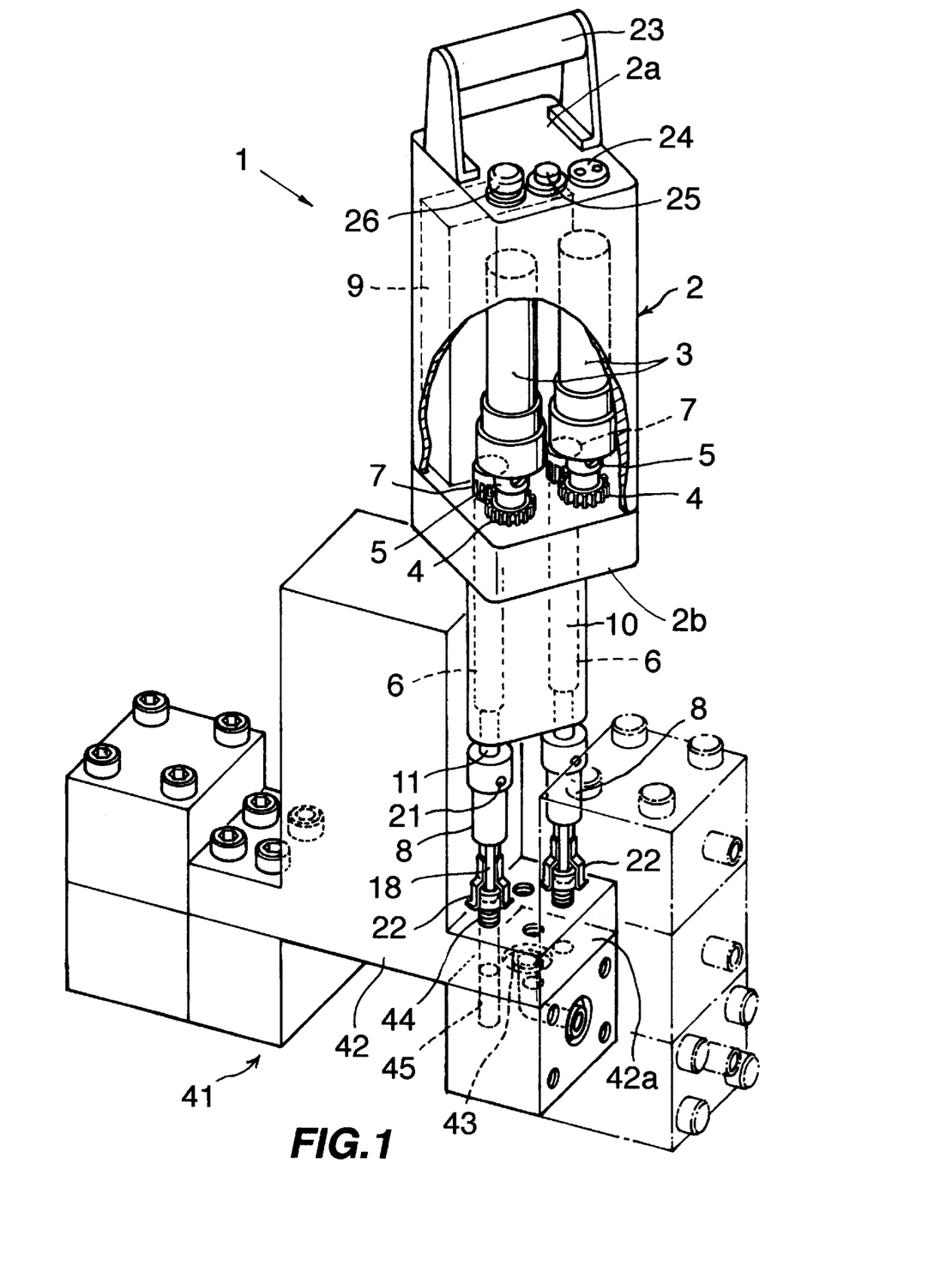
FIG. 1 is a perspective view partly broken away and showing a method of tightening threaded members according to the invention.

FIG. 1 shows an example of a device for use in the threaded member tightening method of the invention. The tightening device 1 is used for tightening and loosening threaded members such as hexagon socket head bolts 44 for installing a massflow controller 42 for use in a gas control apparatus 41 shown in FIG. 1. The massflow controller 42 has a seal comprising a gasket 43. Flanges 42a provided respectively at opposite sides of the controller 42 are each formed with four tapped bores 45, in which four hexagon socket head bolts 44 are screwed. The tightening device 1 is adapted to simultaneously tighten two of the four bolts 44 which are positioned diagonally.

The device 1 comprises a body 2, right and left motors 3 disposed inside the body 2, a spur gear 4 attached by a joint 5 to the forward end of the drive shaft of each motor 3, right and left rotary shafts 6 each carrying at its base end a pinion 7 in mesh with the spur gear 4, right and left wrench portions 8 provided at the forward ends of the respective shafts 6, and a control unit 9 disposed inside the body 2 for controlling the motors 3. The body 2 is formed as a rectangular parallelepiped and has a base end wall 2a, which is provided with a handle 23, connector 24, forward-reverse change-over switch 25 and on-off button switch 26. Play is provided between the spur gear 4 and the drive shaft of the motor 3 for permitting the gear 4 to idly rotate slightly relative to the motor shaft. The right and left rotary shafts 6 extend through the forward end wall 2b of the body 2 and are each rotatably supported at a portion thereof close to its base end by the forward end wall 2b of the body 2. A bearing portion 10 accommodating the opposite shafts 6 is joined to the forward end wall 2b of the body 2. Each rotary shaft 6 has at its forward end a small-diameter portion 11 coaxial with the shaft 6. Since the spur gear 4 has play relative to the drive shaft of the motor 3, the rotary shaft 6 starts to rotate a short period of time after the start of rotation of the motor shaft, following the rotation of the motor shaft. The wrench portion has at its forward end a hexagonal prism 18 shaped in cross section in conformity with the hexagon socket of the bolt 44. The wrench portion 8 is connected to the rotary shaft 6 by stepped bolts 21 axially movably. The hexagonal prism 18 of the wrench portion 8 is provided with a bolt holder 22 comprising three plate springs. The hexagon socket head of the bolt 44 can be held by the bolt holder 22. The control unit 9 comprises, for example, a microcomputer and controls the motors 3 while judging whether each bolt 44, as tightened, is at a proper level and also checking the bolts 44 for relative level to judge whether the bolts are equivalently tightened.

The angle of rotation of the bolt 44 or the displacement thereof is used as the amount of tightening of the threaded member. The angle of rotation of the bolt 44 can be determined, for example, by an encoder. The rotational angle of the bolt 44 can of course be determined from the angle of rotation of the rotary shaft 6. Alternatively, the angle of rotation can be detected by using a potentiometer and converting an analog signal to an angle. The displacement of the bolt 44 can be determined by measuring the distance between the bolt 44 and the massflow controller 42 with a potentiometer, eddy current displacement sensor, laser displacement sensor, or the like. The tightening torque can be determined by using a strain gauge affixed to the rotary shaft 6 and converting the strain of the shaft 6 by a tightening torque detector. Alternatively, the tightening torque can be determined by a magnetostrictive torque sensor. Further alternatively, the tightening torque can be calculated from the current for driving the motor 3 utilizing the fact that the current exhibits the same tendency as the tightening torque on a graph.

Figure 2:
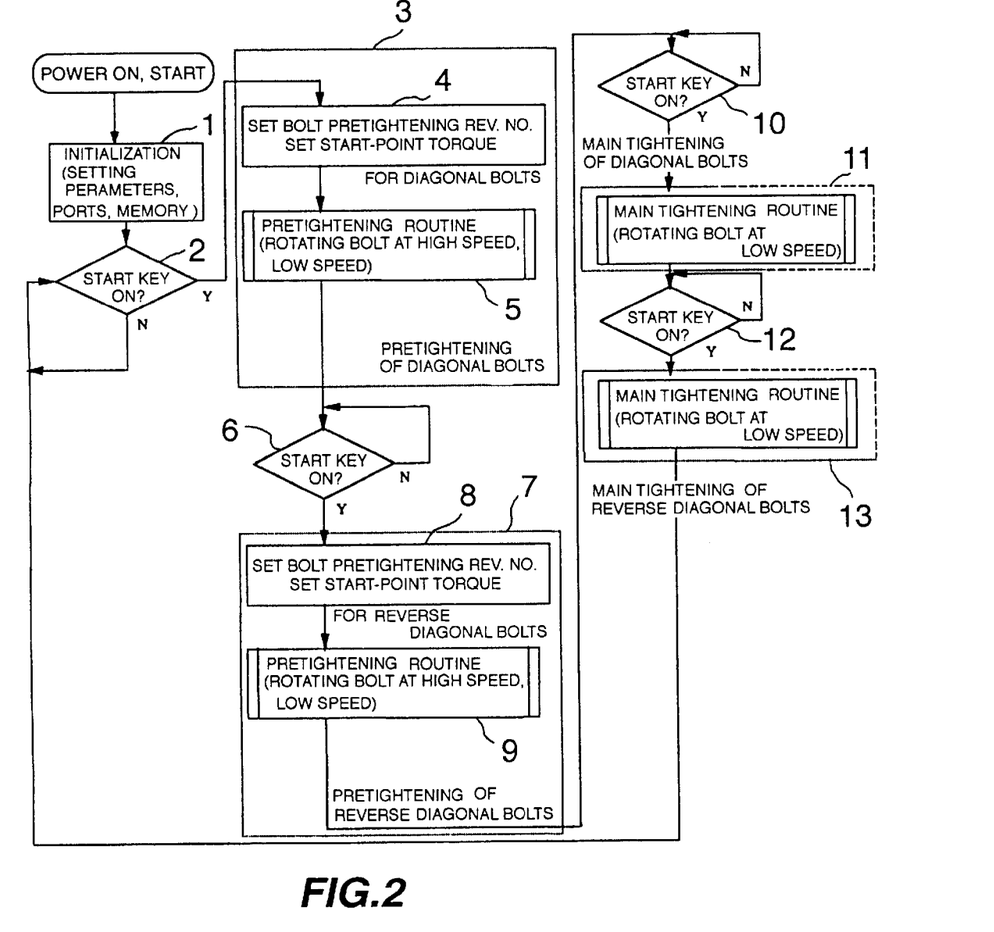
FIG. 2 is a flow chart showing the primary routine of tightening up bolts by the method of the invention in a bolt revolution number control mode.
Figure 3:
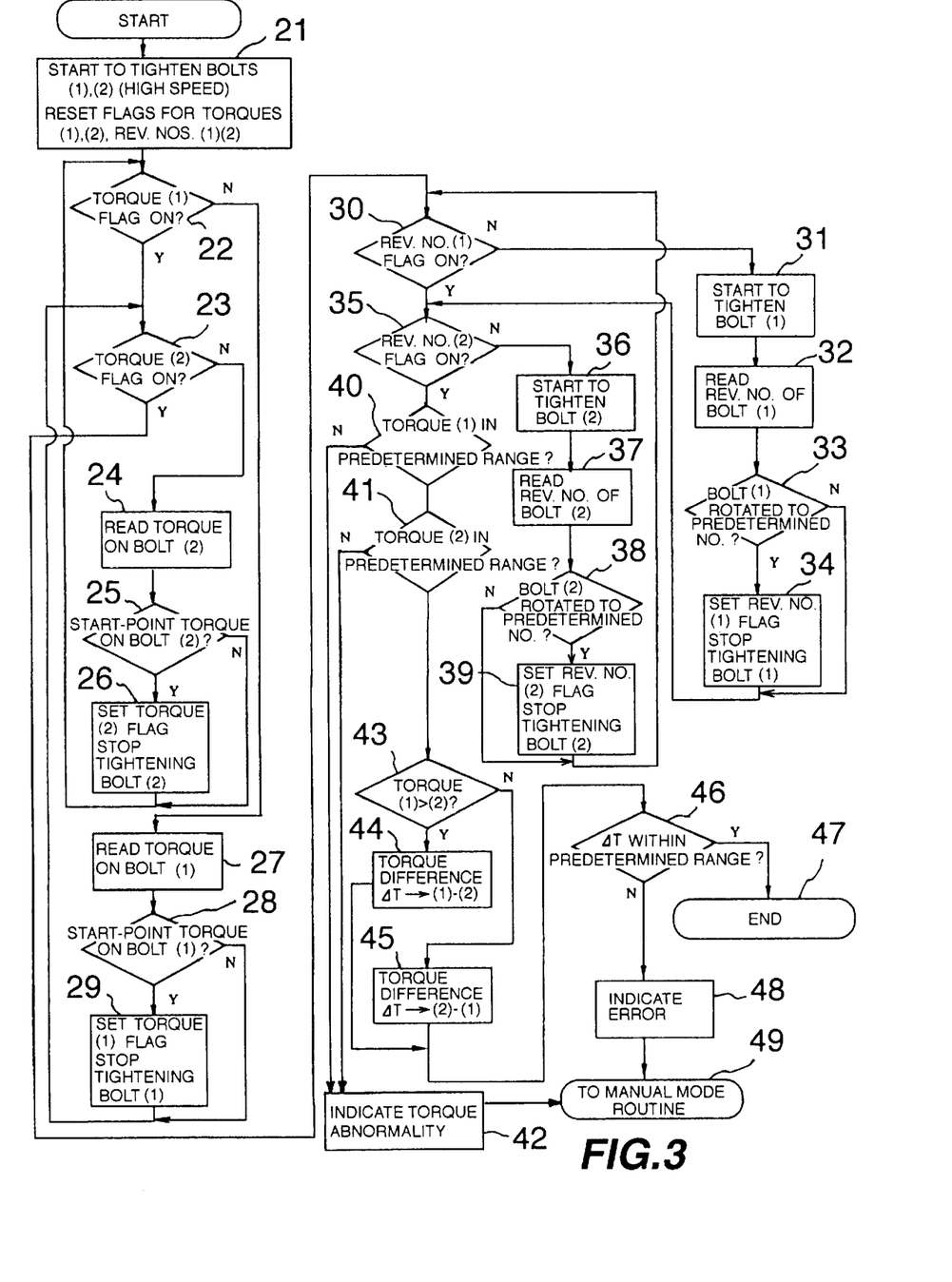
FIG. 3 is a flow chart of a pretightening routine of the same.
Figure 4:
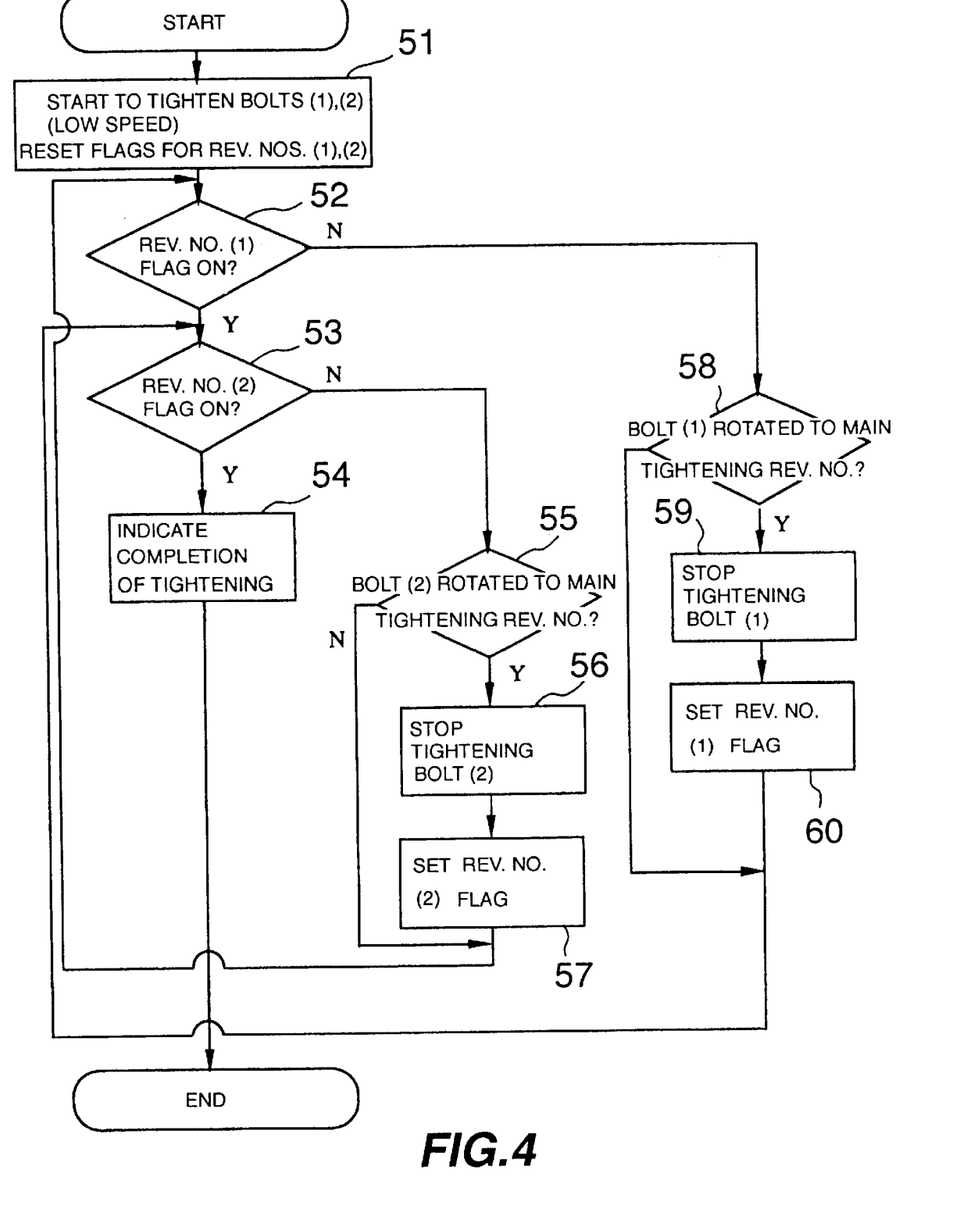
FIG. 4 is a flow chart of a main tightening routine of the same.
Figure 5:
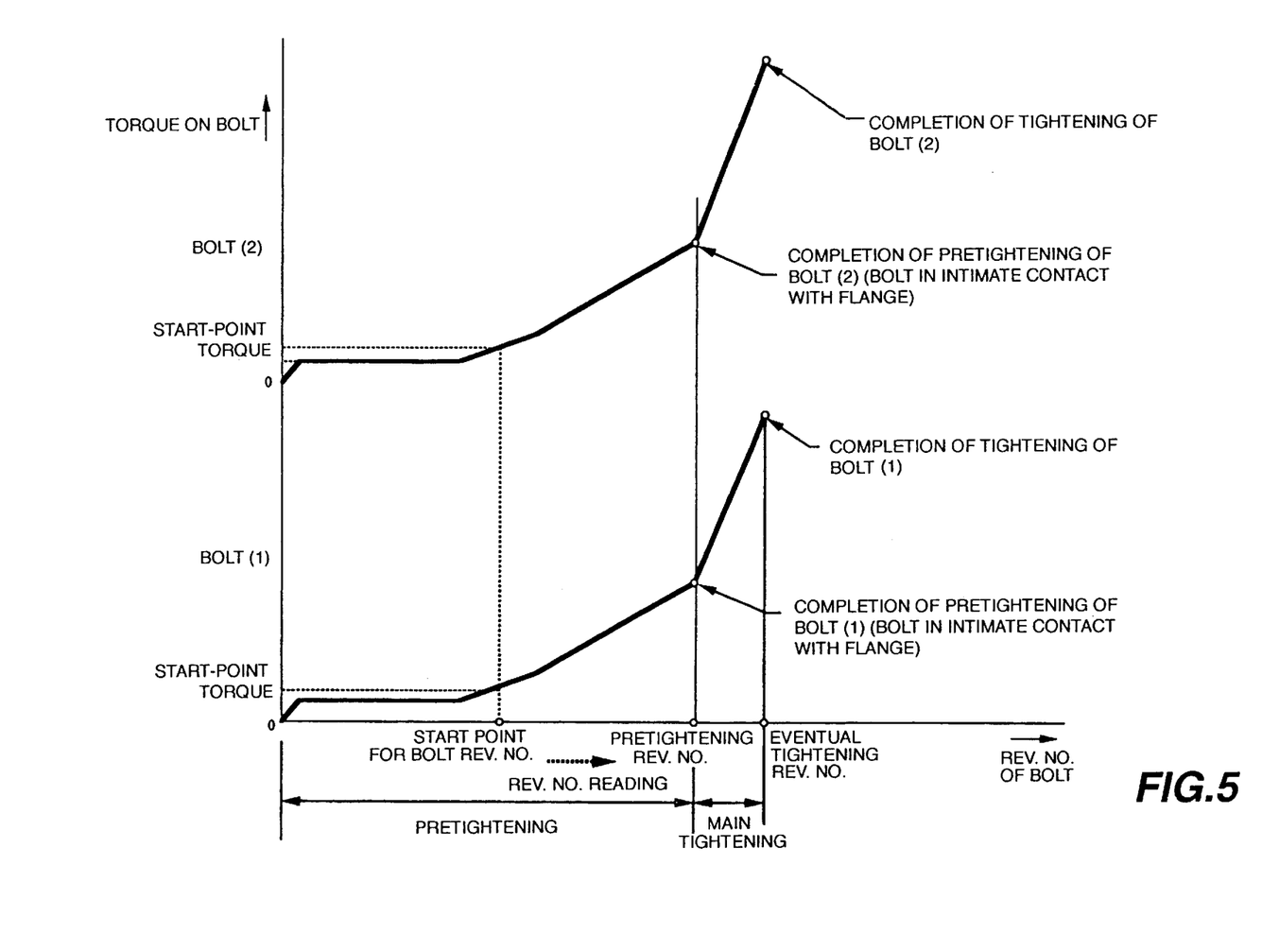
FIG. 5 is a graph of the relationship between the bolt revolution number and the bolt torque to show an overall checking procedure in the same mode.

FIGS. 2 to 4 are flow charts showing one mode of practicing the method of tightening four bolts arranged at four corners of the member to be fastened using the tightening device 1 (bolt revolution number control mode). FIG. 5 shows the relationship between the bolt revolution number and the bolt torque, as established for two bolts positioned diagonally and each provided with a spring washer when the bolts were tightened up normally.

With reference to FIG. 5, the bolt is tightened with constant small torque after the bolt starts to rotate and until the bolt comes into contact with the spring washer. Upon the bolt coming into contact with the spring washer, the torque increases with an approximately constant gradient until the bolt intimately contacts the surface of the member to be fastened (flange). Upon the bolt coming into intimate contact with the flange, the gradient of torque increases, and the torque thereafter increases with the same gradient. Suppose the proper tightening torque upon the bolt coming into intimate contact with the flange is 10 kgf cm, and the proper tightening torque at the time of complete tightening is 30 kgf cm.

With reference to FIG. 2, the primary routine of the tightening method in the bolt revolution number control mode will be described first.

First, the hardware of the microcomputer is initialized to set the parameters, ports and memory for the start of operation (step 1). The start key is then pressed (step 2) to pretighten two of the four bolts which are positioned diagonally (step 3). In step 3, a bolt pretightening revolution number and start-point torque are set first (step 4). Specified as the start point toque is a torque value immediately after the tightening torque starts to increase upon the bolt coming into contact with the spring washer. The predetermined bolt pretightening revolution number is based on, and counted from, the revolution number giving this torque value and is a revolution number that brings the bolt into intimate contact with the flange (see FIG. 5). Subsequently, based on the pretightening routine to be described below, the bolts in the diagonal position are checked as to whether they are pretightened properly (step 5).

When the bolts positioned diagonally (diagonal bolts) are judged to be pretightened properly, the tightening device 1 is removed from the diagonal bolts and then fitted to the other bolts positioned along the other or reverse diagonal line (reverse diagonal bolts). When the start key is then pressed (step 6), the reverse diagonal bolts are pretightened (step 7). Step 7 is similar to step 3; a bolt pretightening revolution number and start-point torque are set first (step 8). According to the pretightening routine, the reverse diagonal bolts are checked as to whether they are pretightened properly (step 9). Since the reverse diagonal bolts differ from the first diagonal bolts in tightening torque curve, the bolt pretightening revolution number and the start-point torque set are values determined for reverse diagonal bolts by actual tightening.

When the reverse diagonal bolts are completely pretightened, the device 1 is removed from these bolts and fitted to the first diagonal bolts. Depression of the start key (step 10) is followed by the main tightening of the diagonal bolts in accordance with the main tightening routine to be described below (step 11). The device 1 is then removed from the first diagonal bolts and set on the reverse diagonal bolts. Depression of the start key (step 12) is followed by the main tightening of the reverse diagonal bolts according to the main tightening routine, whereby a sequence of tightening operations is completed for the four bolts (step 13). Step 2 follows again to repeat the foregoing steps when another set of four bolts are to be tightened up.

In the foregoing process, the bolt is rotated at a high speed for pretightening and at a low speed for main tightening. In the pretightening operation, the first half of the operation may be effected at a high speed, and the second half thereof at a low speed. Although the torque value at a time immediately after the tightening torque starts to increase following the contact of the bolt with the spring washer is selected as the predetermined start-point torque, the predetermined torque may be the value at the time when the bolt is engaged in the tapped bore or the value given when the bolt has been rotated by one turn or two turns.

Next, the pretightening routine of the tightening method will be described with reference to FIG. 3.

First, bolt (1) and bolt (2) are rotated at a high speed for the start of tightening, and flags for torque (1), torque (2), revolution number (1) and revolution number (2) are reset (step 21). The flags for torque (1) and torque (2) are set when the torque of bolt (1) and bolt (2) reaches a value not smaller than the predetermined start-point torque. The flags for revolution number (1) and revolution number (2) are set when bolt (1) and bolt (2) are rotated at least to the predetermined pretightening revolution number.

Next, the flag for torque (1) is checked as to whether it is set (step 22). When the flag is found to be set, whether the flag for torque (2) is set is checked (step 23). If the flag for torque (2) is found to be on, this is interpreted as indicating that bolt (1) and bolt (2) are both at the start point, and the sequence proceeds to step 30. If the flag for torque (1) is not found to be on in step 22, the torque of bolt (1) is read (step 27) and checked as to whether it is not smaller than the predetermined start-point torque (step 28). When the torque is found to be not smaller than the start-point torque in step 28, the flag for torque (1) is set, and tightening of bolt (1) is discontinued (step 29), followed by step 23. If the torque of bolt (1) is found to be smaller than the start-point value in step 28, step 23 directly follows. If the flag for torque (2) is not found to be set in step 23, the torque of bolt (2) is read (step 24) and checked as to whether it is not smaller than the start-point value (step 25). If the torque of bolt (2) is found to be at least the start-point value in step 25, the flag for torque (2) is set, and tightening of bolt (2) is discontinued (step 26), followed by step 22. If the torque of bolt (2) is found to be smaller than the start-point value in step 25, step 22 directly follows.

Upon the torque of one of the bolts reaching the predetermined value in the foregoing steps 22 to 29, tightening of that bolt is discontinued, and the other bolt is continuously tightened until the predetermined torque value is reached. With the two bolts thus tightened with the predetermined torque, the sequence proceeds to step 30 and the following for pretightening on the basis of the bolt revolution number.

In step 30 et seq., an inquiry is made as to whether the flag for revolution number (1) is set (step 30). If the answer is negative, tightening of bolt (1) is started (step 31), and the number of revolutions of bolt (1) is read (step 32). An inquiry is made as to whether the number is at least the predetermined pretightening revolution number (step 33). When the answer to the inquiry is affirmative, bolt (1) is judged to be pretightened normally, the flag for revolution number (1) is set, and the tightening of bolt (1) is discontinued (step 34), followed by step 35. When the flag for revolution number (2) is not found to be set in step 35, step 36 starts to tighten bolt (2), and the number of revolutions of bolt (2) is read (step 37). An inquiry is made as to whether the number is at least the predetermined pretightening revolution number (step 38). When the answer is affirmative, bolt (2) is judged to be pretightened normally, the flag for revolution number (2) is set, and tightening of bolt (2) is discontinued (step 39), followed by step 30. If the flag for revolution number (2) is found on in step 35, this is interpreted as indicating that the pretightening revolution number (absolute level) of each of bolts (1), (2) is within a predetermined range, followed by checking as to whether the bolts are tightened normally. First, an inquiry is made as to whether torque (1) is within a predetermined range (step 40). If the answer is negative, torque abnormality is indicated (step 42), and the routine is changed over to a manual mode routine (step 49). If the answer is affirmative, an inquiry is made as to whether torque (2) is within the predetermined range (step 41). When the answer is negative, torque abnormality is indicated (step 42), followed by a change-over to the manual mode routine (step 49). When torque (1) and torque (2) are both within the predetermined range, torque (1) is compared with torque (2) (step 43). In the case where torque (1) is greater, torque (2) is subtracted from torque (1) to calculate the torque difference ΔT (step 44). If torque (1) is not greater than torque (2), torque (1) is subtracted from toque (2) to calculate the torque difference ΔT (step 45). An inquiry is then made as to whether the torque difference ΔT is within a predetermined range (step 46). When the answer is affirmative, this is interpreted as indicating that the bolts are tightened properly, and the sequence comes to an end (step 47). If the answer is negative, the bolts are judged to be tightened unequivalently, and an unequivalent tightening error is indicated (step 48), followed by a change-over to the manual mode routine (step 49).

Upon the torque of one of the bolts reaching the predetermined revolution number first in the foregoing steps 30 to 39, tightening of that bolt is discontinued, and the other bolt is continuously tightened until the predetermined revolution number is reached. With the two bolts thus tightened at least to the predetermined revolution number, the sequence proceeds to step 40 and the following.

Next, the main tightening routine of the present tightening method will be described with reference to FIG. 4.

First, bolt (1) and bolt (2) are rotated at a low speed for the start of tightening, and flags for revolution number (1) and revolution number (2) are reset (step 51). The flags for revolution number (1) and revolution number (2) are set when bolt (1) and bolt (2) are rotated at least to the predetermined main tightening revolution number. This number is an eventual bolt tightening revolution number based on and counted from the bolt pretightening revolution number. The flag for revolution number (1) is checked as to whether it is set (step 52). If the flag for revolution number (1) is found to be on in step 52, the flag for revolution number (2) is checked as to whether it is on (step 53). If it is found to be on in step 53, the bolts are judged to be tightened properly to terminate the routine.

In the case where the flag for revolution number (1) is not found to be on in step 52, revolution number (1) of bolt (1) is read, and an inquiry is made as to whether the number is at least the main tightening revolution number (step 58). If the answer is affirmative, main tightening of bolt (1) is judged to be effected normally, tightening of bolt (1) is discontinued (step 59), the flag for revolution number (1) is set (step 60), and step 53 follows to check whether the flag for revolution number (2) is set. If the revolution number (1) is smaller than the main tightening revolution number, bolt (1) is continuously tightened, followed by step 53 to check whether the flag for revolution number (2) is set. If the flag is not found to be on in step 53, revolution number (2) of bolt (2) is read, and an inquiry is made as to whether this number is at least the main tightening revolution number (step 55). If the answer is affirmative, main tightening of bolt (2) is judged to be effected normally, tightening of bolt (2) is discontinued (step 56), the flag for revolution number (2) is set (step 57), and the sequence returns to step 52 to check whether the flag for revolution number (1) is on. In this way, the flags for revolution numbers (1), (2) are eventually set, and the sequence proceeds to step 54 to terminate the routine.

Thus, the four bolts can be tightened up equivalently with proper torque using the device 1 for tightening two bolts at the same time.

Since the tightening torque is checked in the pretightening routine as to whether the torque is within the predetermined range, it is not necessary to check in the main tightening torque whether the tightening torque is within a predetermined range, and the program can be simplified by a corresponding amount. Whether the eventual torque is within the predetermined torque may of course be checked, or the main tightening routine may be performed in exactly the same manner as the pretightening routine.

Figure 6:
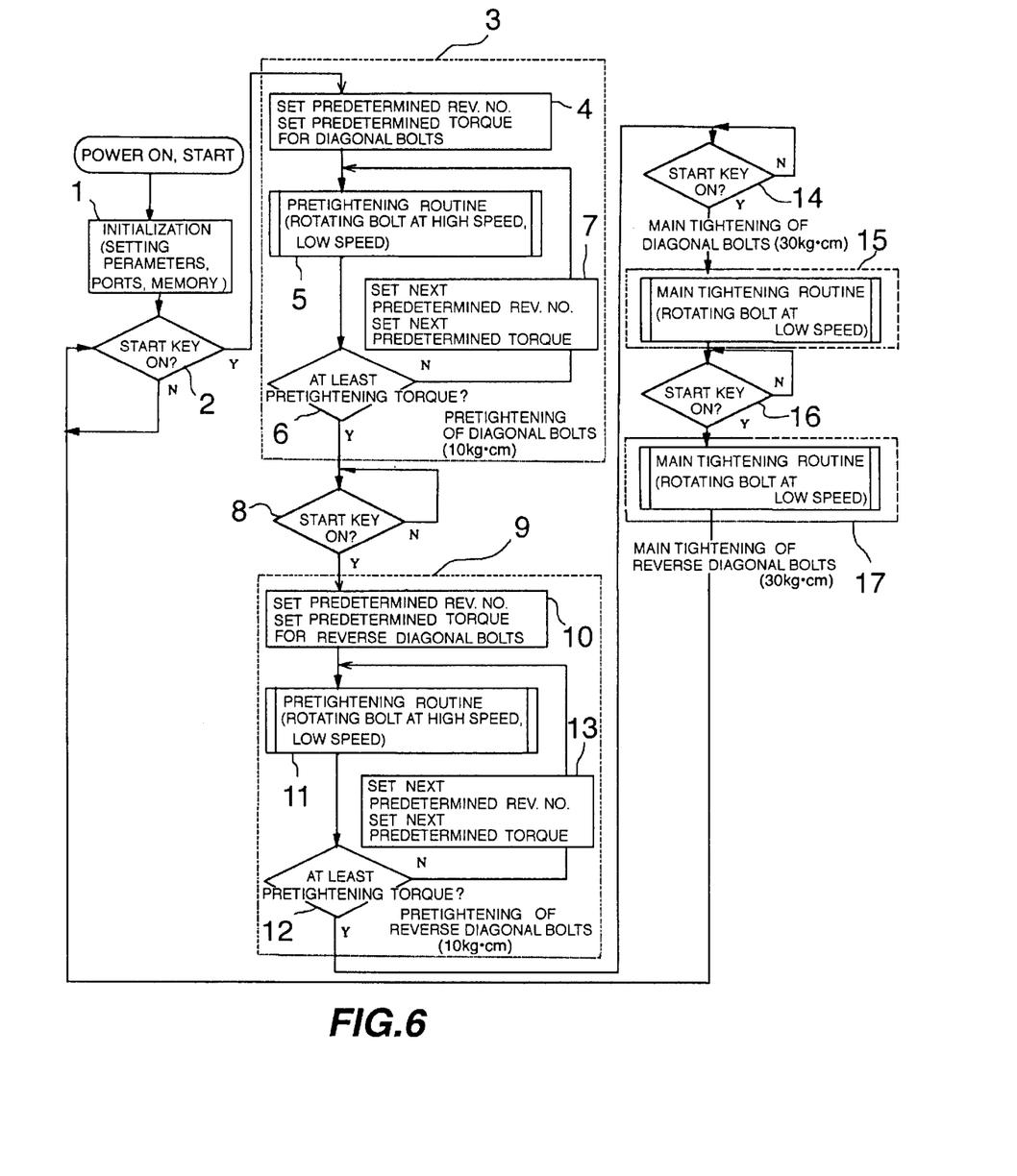
FIG. 6 is a flow chart of the primary routine of tightening up bolts by the method of the invention in a bolt tightening torque control mode.
Figure 7:
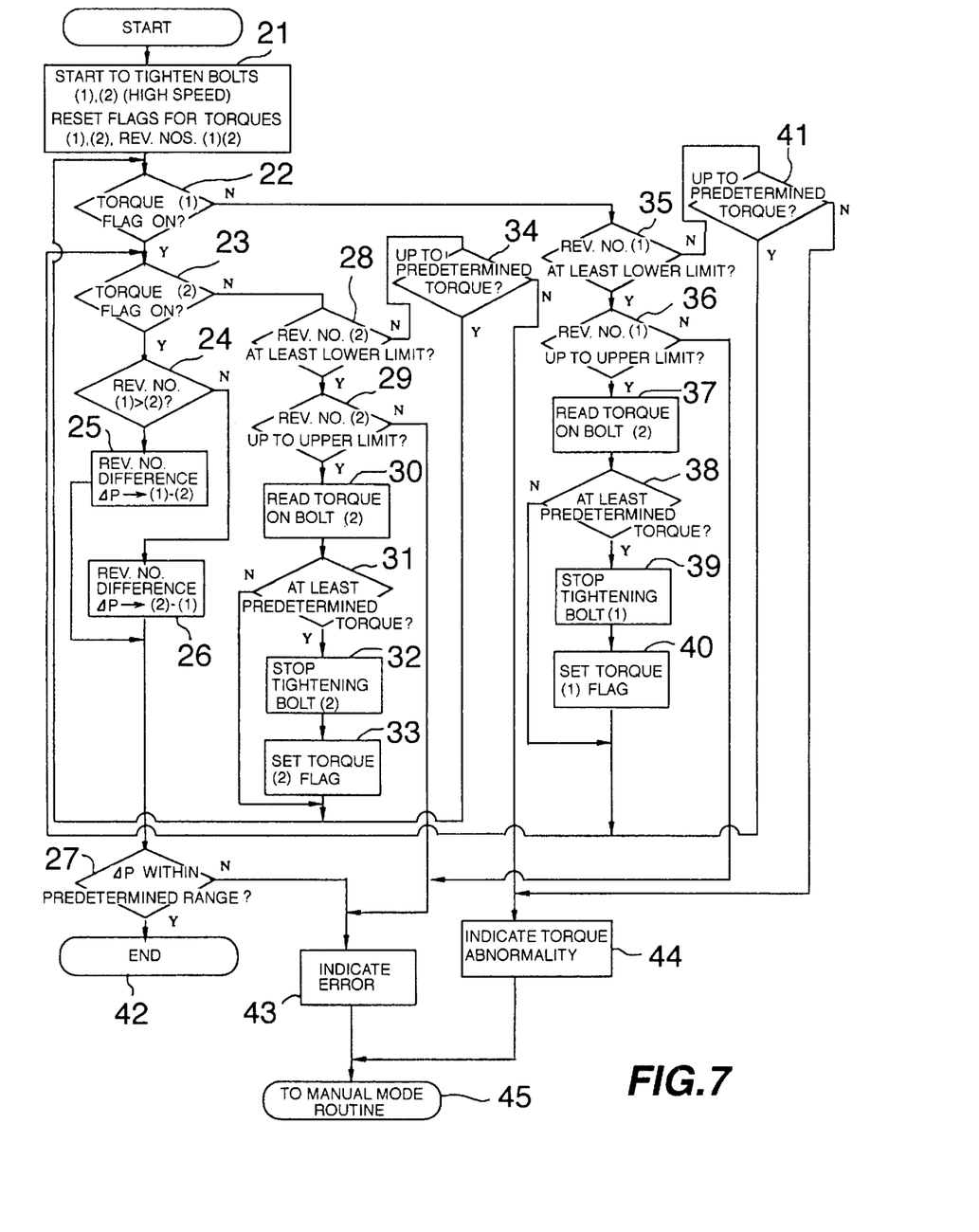
FIG. 7 is a flow chart of a pretightening routine of the same.
Figure 8:
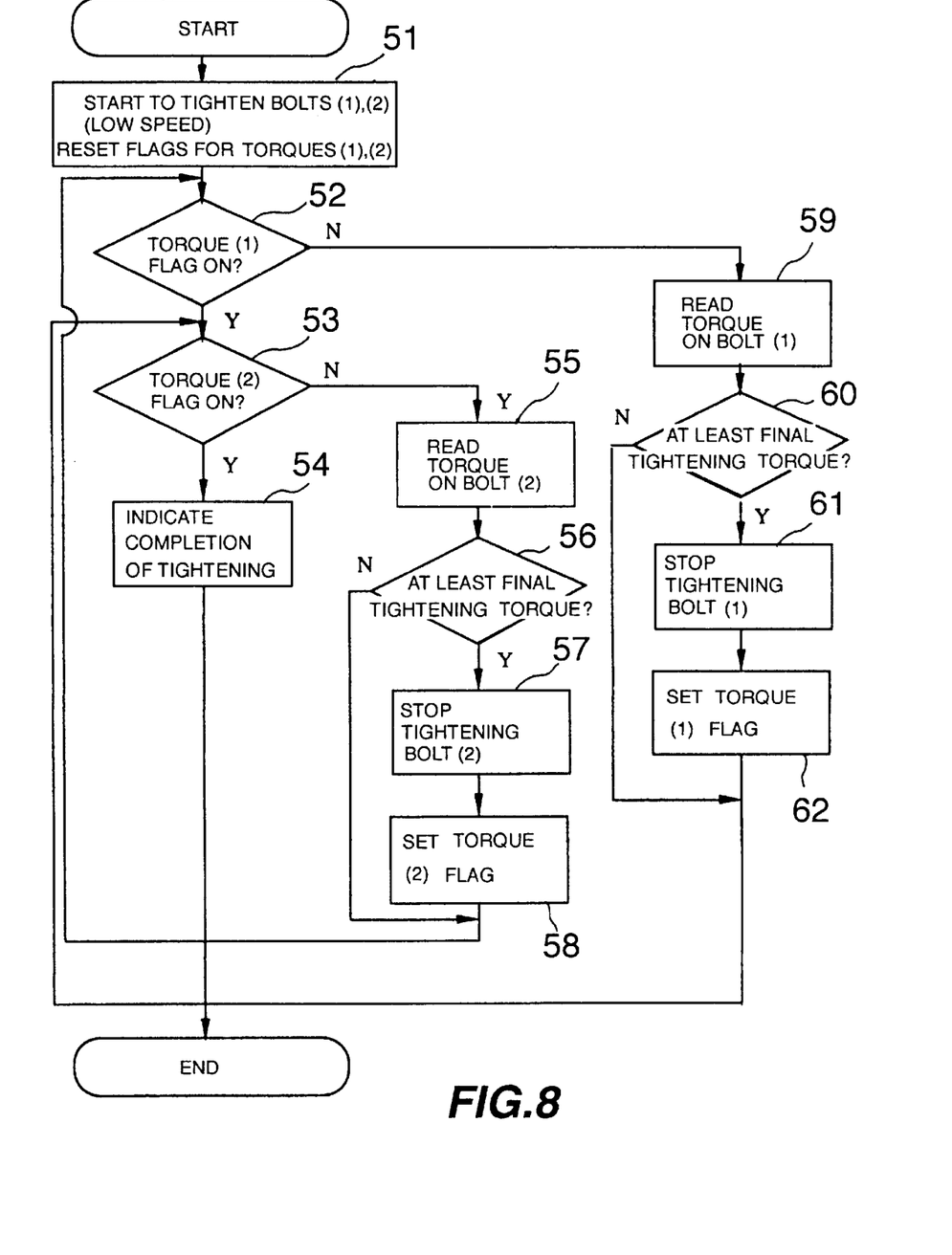
FIG. 8 is a flow chart of a main tightening routine of the same.
Figure 9:
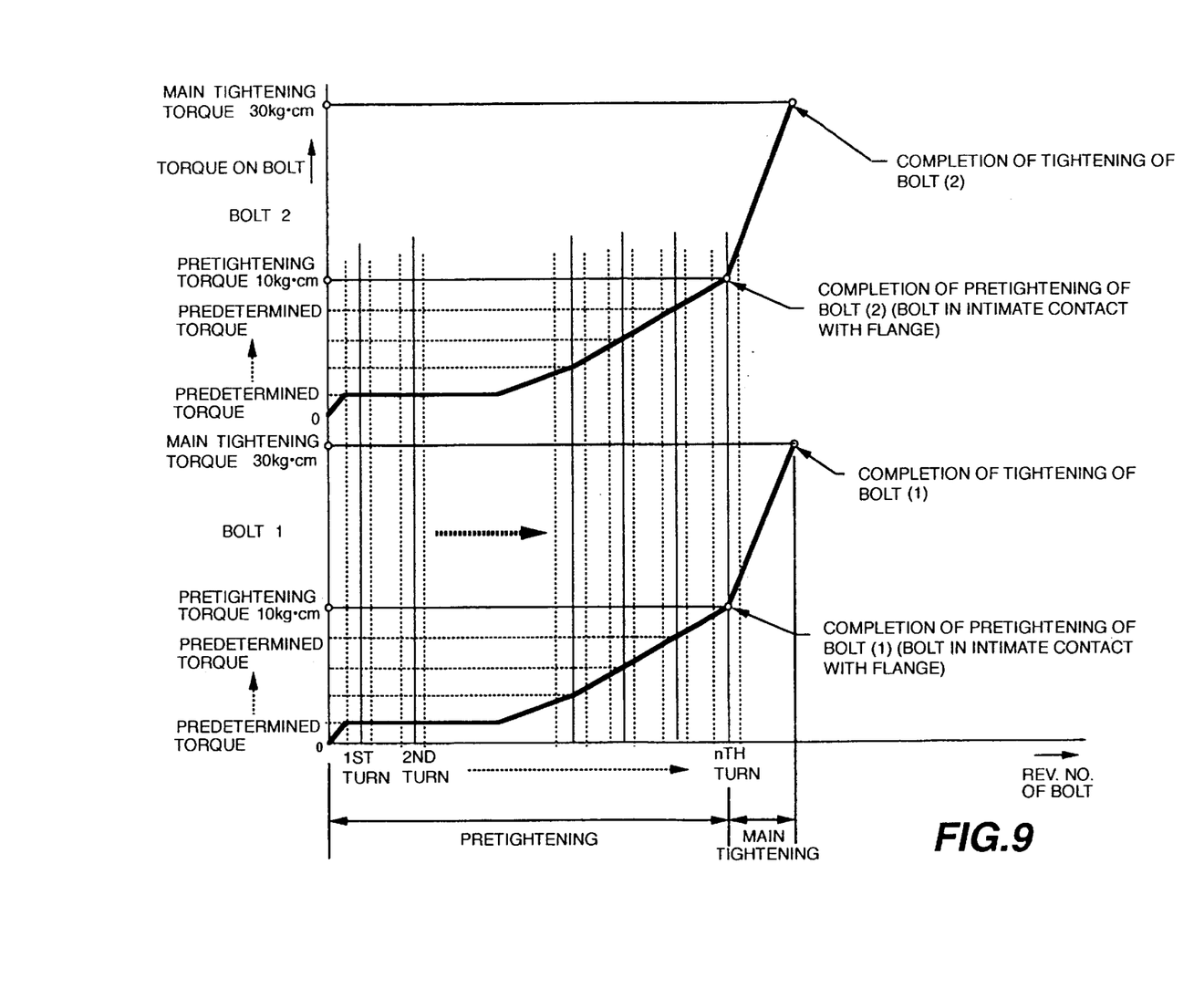
FIG. 9 is a graph of the relationship between the bolt revolution number and the bolt torque to show an overall checking procedure in the same mode.

FIGS. 6 to 8 are flow charts showing another mode (bolt tightening torque control mode) of the method of tightening four bolts at four corners of the member to be fastened by the tightening device. FIG. 9 shows a graph corresponding to the graph of FIG. 5 which shows the relationship between the bolt revolution number and the bolt torque and in which the scales of abscissa and ordinate are altered in conformity with the present mode of tightening method. It is seen that when rotated n turns, the bolt comes into intimate contact with the flange, and the proper tightening torque (pretightening torque) at this time is 10 kgf-cm.

With reference to FIG. 6, a description will be given first of the primary routine of the tightening method in the bolt tightening torque control mode.

First, the hardware of the microcomputer is initialized to set the parameters, ports and memory for the start of operation (step 1). The start key is then pressed (step 2) to pretighten two of the four bolts which are positioned diagonally (step 3). In step 3, a predetermined bolt pretightening revolution number and predetermined diagonal bolt torque are set (step 4). In connection with the predetermined revolution number which is based on one revolution of the bolt, a required range is added to obtain a predetermined upper limit of revolution numbers and a predetermined lower limit thereof for use as reference values. The predetermined torque is the tightening torque resulting from exactly one revolution of the bolt. According to the pretightening routine to be described below, an inquiry is then made as to whether the tightening torque for the first revolution of the bolt is within the range of predetermined torque (step 5). If the answer is affirmative, an inquiry is made as to whether the tightening torque has reached the pretightening torque (10 kgf cm) (step 6). When the pretightening torque is not reached, the next predetermined bolt revolution number and predetermined diagonal bolt torque are set (step 7), followed by step 5. The predetermined bolt revolution number is based on one revolution of the bolt, predetermined torque is set for each revolution of the bolt. The pretightening routine of step 5 is repeated until the bolt is rotated n turns. Incidentally, in the second half of the pretightening procedure, the predetermined bolt revolution number may be based, for example, on half turn to increase the checking frequency and obtain a more accurate result. When no abnormality occurs in the pretightening routine, the tightening torque reaches the pretightening torque (10 kgf cm), and the pretightening of step 3 for the diagonal bolts is completed.

The tightening device 1 is removed from the diagonal bolts and then set on the reverse diagonal bolts. Depression of the start key (step 8) starts pretightening of the reverse diagonal bolts (step 9). In step 9 which is the same as step 3, a predetermined bolt revolution number and predetermined torque for the reverse diagonal bolts are set (step 10). According to the pretightening routine, the tightening torque is checked as to whether it is in the range of predetermined torque (step 11). If the result is acceptable, an inquiry is made as to whether the tightening torque has reached the pretightening torque (10 kgf cm) (step 12). When the pretightening torque is not reached, the next predetermined bolt revolution number and predetermined toque for the reverse diagonal bolts are set (step 13), followed by pretightening routine of step 11. When no abnormality occurs in the pretightening routine, the tightening torque reaches the pretightening torque (10 kgf cm), and the pretightening of step 9 for the reverse diagonal bolts is completed. As to the predetermined torque values in steps 10 and 13, the first diagonal bolts differ from the reverse diagonal bolts in torque curve, so that torques are predetermined based on the actual result of tightening operation for the reverse diagonal bolts.

When the reverse diagonal bolts are completely pretightened, the device 1 is removed from these bolts and fitted to the first diagonal bolts. Depression of the start key (step 14) is followed by the main tightening of the diagonal bolts in accordance with the main tightening routine to be described below (step 15). The diagonal bolts are tightened in step 15 with main tightening torque (30 kgf cm). The device 1 is then removed from the first diagonal bolts and set on the reverse diagonal bolts. Depression of the start key (step 16) is followed by the main tightening of the reverse diagonal bolts according to the main tightening routine, and the reverse diagonal bolts are tightened with the main tightening torque (30 kgf cm), whereby a sequence of tightening operations is completed for the four bolts (step 17). Step 2 follows again to repeat the foregoing steps when another set of four bolts are to be tightened up.

In the foregoing process, the bolt is rotated at a high speed for pretightening and at a low speed for main tightening. In the pretightening operation, the first half of the operation may be effected at a high speed, and the second half thereof at a low speed.

Next, the pretightening routine of the tightening method will be described with reference to FIG. 7.

First, bolt (1) and bolt (2) are rotated at a high speed for the start of tightening, and flags for torque (1) and torque (2) are reset (step 21). The flags for torque (1) and torque (2) are set when the torque of bolt (1) and bolt (2) becomes not smaller than a value corresponding to a predetermined revolution number. Next, an inquiry is made as to whether the flag for torque (1) is set (step 22). If the answer is affirmative, the flag for torque (2) is checked as to whether it is set (step 23).

If the flag for the torque (2) is on, this indicates that the absolute level of tightening torque of bolts (1) and (2) is within a predetermined range, followed by checking of relative level. More specifically, revolution number (1) of bolt (1) is compared with revolution number (2) of bolt (2) (step 24). If the number (1) is greater, the number (2) is subtracted from the number (1) to calculate the difference $\Delta P$ in bolt revolution number (step 25). If the number (1) is not greater than the number (2), the number (1) is subtracted from the number (2) to determine the difference $\Delta P$ in bolt revolution number (step 26). An inquiry is then made as to whether the bolt revolution number difference $\Delta P$ is within a predetermined range (step 27). When the answer is affirmative, the bolts are judged to be properly tightened, whereupon the sequence comes to an end (step 42). When the answer to the inquiry of step 27 is negative, bolts are judges to be unequivalently tightened, and an unequivalent tightening error is indicated (step 43), followed by a changeover to a manual mode routine (step 45).

If the flag for torque (1) is not found to be on in step 22, revolution number (1) is read, and an inquiry is made as to whether the number is at least the predetermined revolution number lower limit (step 35). When the answer to the inquiry of step 35 is affirmative, an inquiry is further made as to whether revolution number (1) is up to the predetermined revolution number upper limit (step 36). If the answer to the inquiry of step 36 is affirmative, torque (1) of bolt (1) is read (step 37) and checked as to whether torque (1) is not lower than the predetermined torque (step 38). When torque (1) is not lower than the predetermined torque, this is interpreted as indicating that bolt (1) is normally tightened, tightening of bolt (1) is discontinued (step 39), the flag for torque (1) is set (step 40), and the sequence proceeds to step 23 wherein flag (2) is checked as to whether it is set. If torque (1) is found to be lower than the predetermined torque in step 38, an inquiry is made in step 23 as to whether the flag for torque (2) is set, with bolt (1) continuously tightened. If revolution number (1) is found to be lower than the predetermined lower limit in step 35, torque (1) is read, and an inquiry is made as to whether it is up to the predetermined torque (step 41). When the answer is affirmative, step 23 follows in which the flag for torque (2) is checked as to whether it is set, with bolt (1) continuously tightened. If the answer to the inquiry of step 41 is negative, this is interpreted as indicating that torque (1) has reached the predetermined torque before revolution number (1) reaches the predetermined lower limit, whereupon abnormal torque is indicated (step 44), followed by a change-over to the manual mode routine (step 45).

In the case where the flag for torque (2) is not found to be on in step 23, revolution number (2) is read, followed by the same procedure as steps 35 to 41 for bolt (1). More specifically, an inquiry is made as to whether revolution number (2) is at least the predetermined revolution number lower limit (step 28). When the number (2) is at least the predetermined revolution number lower limit, an inquiry is further made as to whether revolution number (2) is up to the predetermined revolution number upper limit (step 29). If the answer to the inquiry of step 29 is affirmative, torque (2) of bolt (2) is read (step 30) and checked as to whether torque (2) is not lower than the predetermined torque (step 31). When torque (2) is not lower than the predetermined torque, this is interpreted as indicating that bolt (2) is normally tightened, tightening of bolt (2) is discontinued (step 32), the flag for torque (2) is set (step 33), and the sequence returns to step 22 wherein the flag for torque (2) is checked as to whether it is set. If torque (2) is found to be lower than the predetermined torque in step 31, the sequence returns to step 22 in which the flag for torque (1) is checked as to whether the flag set, with bolt (1) continuously tightened. If revolution number (2) is found to be lower than the predetermined lower limit in step 28, torque (2) is read, and an inquiry is made as to whether it is up to the predetermined torque (step 34). When the answer is affirmative, step 22 follows again in which the flag for torque (1) is checked as to whether it is set. If the answer to the inquiry of step 34 is negative, this is interpreted as indicating that torque (2) has reached the predetermined torque before revolution number (2) reaches the predetermined lower limit, whereupon torque abnormality is indicated (step 44), followed by a change-over to the manual mode routine (step 45).

When torque (1) and torque (2) are not abnormal, the flags for torque (1) and torque (2) are both eventually set, followed by step 24 in which revolution number (1) is compared with revolution number (2) for the checking of relative level.

For example if torque (1) of bolt (1) reaches the predetermined torque first in the pretightening routine described, tightening of bolt (1) is discontinued, and bolt (2) only is tightened. Accordingly, bolt (1) is unlikely to be overtightened. Upon revolution number (2) of bolt (2) exceeding the predetermined upper limit before torque (2) reaches the predetermined torque, the bolts are judged to be unequivalently tightened. Further if torque (2) reaches the predetermined torque before revolution number (2) of bolt (2) reaches the predetermined upper limit, the bolts are judged to be unequivalently tightened in step 27 in the case where revolution number (2) of bolt (2) is excessively greater than that of bolt (1). Further even with torques (1), (2) of bolts (1), (2) reaching the predetermined torque, an abnormality is recognized in step 34 or 41 if revolution number (1) or (2) is below the predetermined lower limit in this case. This eliminates the likelihood of the operator forgetting to insert the gasket to be installed in the sealed portion. Thus, the bolt is judged to be properly tightened only when the predetermined torque is reached, with the revolution number within the predetermined limits. When the bolts are thus found properly tightened, the sequence proceeds to the subsequent step.

Next, the main tightening routine of the present tightening method will be described with reference to FIG. 8.

First, bolt (1) and bolt (2) are rotated at a low speed for the start of tightening, and flags for torque (1) and torque (2) are reset (step 51). The flags for torque (1) and torque (2) are set when the torque of bolt (1) and bolt (2) increases least to the predetermined final tightening torque value. The flag for torque (1) is subsequently checked as to whether it is set (step 52). If the flag is found on in step 52, the flag for torque (2) is checked as to whether it is on (step 53). If it is found to be on in step 53, the bolts are judged to be tightened properly to terminate the routine (step 54).

In the case where the flag for torque (1) is not found to be on in step 52, torque (1) of bolt (1) is read (step 59), and an inquiry is made as to whether the torque is at least the final tightening torque value (step 60). If the answer to the inquiry of step 60 is affirmative, main tightening of bolt (1) is judged to be effected normally, tightening of bolt (1) is discontinued (step 61), the flag for torque (1) is set (step 62), and step 53 follows to check whether the flag for torque (2) is set. If the torque (1) is smaller than the final tightening torque in step 60, bolt (1) is continuously tightened, followed by step 53 to check whether the flag for toque (2) is set. If the flag is not found to be on in step 53, torque (2) of bolt (2) is read (step 55), and an inquiry is made as to whether the torque is at least the final tightening torque value (step 56). If the answer to the inquiry of step 56 is affirmative, main tightening of bolt (2) is judged to be effected normally, tightening of bolt (2) is discontinued (step 57), the flag for torque (2) is set (step 58), and the sequence returns to step 52 to check whether the flag for torque (1) is on. If the torque (2) is smaller than the final tightening value in step 56, step 52 follows again to check whether the flag for torque (1) is set, with bolt (2) continuously tightened. In this way, the flags for torques (1), (2) are eventually set, and the sequence proceeds to step 54 to terminate the routine.

The pretightening routine increases the torque of the bolt to the predetermined torque, with the number of revolutions thereof within the predetermined range, so that it is unnecessary to check in the main tightening routine whether the revolution number is within the predetermined range. This serves to simplify the program by a corresponding amount. The final revolution number may be checked as to whether it is within a predetermined range, or the main tightening routine may of course be performed in exactly the same manner as the pretightening routine.

The four bolts can be tightened up equivalently with proper torque by the above mode of tightening method in the same manner as in the bolt revolution number control mode using the device 1 for tightening two bolts at the same time.

According to the tightening method as practiced in the bolt tightening torque control mode unlike the bolt revolution number control mode, the bolt is checked in the initial stage of tightening and subsequently several times as to whether it is tightened properly. The torque control mode therefore has the advantage that abnormalities in tightening are detectable early to preclude the deformation of the bolts and the member to be fastened.

With the tightening method in the bolt revolution number control mode, as well as in the bolt tightening torque control mode, the two bolts as positioned on one diagonal line or on the other diagonal line are rotated at the same time, whereas these bolts can be individually rotated not at the same time. In corresponding relation to this case, the tightening device may be so adapted as to rotate the two rotary shafts individually. Although the tightening method as practiced in either of the two modes comprises a pretightening routine and main tightening routine separate therefrom, the entire tightening operation may be carried out in the same manner as the pretightening routine shown in FIG. 3 or 7 without resorting to the main tightening routine. The flow chart of FIG. 3 or 7 is concerned with a case where two bolts are tightened up, whereas the flow chart can be readily expanded for tightening up three or four bolts. Three or four bolts can be tightened up at the same time according to the expanded flow chart. Although the device 1 described is adapted to tighten up two bolts 44 at the same time, a multishaft tightening device is readily available for tightening up three or four bolts at the same time by using three or four sets of rotary shafts 6, wrench portions 8 and motors 3. Three or four bolts can be tightened up simultaneously by using the multishaft device. For example, four bolts can be tightened at the same time by using a four-shaft tightening device and using a method of tightening the four bolts while checking these bolts for absolute level and relative level. With this method of tightening up threaded members, it is also possible to tighten up the members at a time until the eventual tightening torque is reached with the pretightening procedure omitted, hence a simplified tightening procedure. On the other hand, the tightening device 1 described in detail and adapted to simultaneously tighten up two bolts has the advantage of being simpler in construction and in control program than is the case with the method of tightening four threaded members.

What is claimed is:

1. A threaded member tightening method for tightening a plurality of threaded members by drive means, comprising the steps of:

tightening each of the threaded members while detecting the amount of tightening of each respective threaded member and the tightening torque thereof, stopping tightening upon the amount of tightening of each threaded member reaching a specified value based on the time when the tightening torque reaches a predetermined value, and considering each threaded member to be properly tightened when the tightening torque of the threaded member is within a predetermined range and the difference in tightening torque between the threaded members is within a predetermined range.

2. A threaded member tightening method for tightening a plurality of threaded members by drive means, comprising the steps of:

tightening each of the threaded members while detecting the amount of tightening of the threaded member and the tightening torque thereof, stopping tightening upon the tightening torque of each threaded member reaching a predetermined value with the amount of tightening being within a specified range, and judging each threaded member to be properly tightened when the difference in tightening amount between the threaded members is within a specified range.

3. A threaded member tightening method as defined in claim 1 in which the threaded members are all tightened at the same time.

4. A threaded member tightening method as defined in claim 2 in which the threaded members are all tightened at the same time and, when the tightening torque on one of the members has reached a predetermined value with the tightening amount being within the specified range, tightening of the threaded member is discontinued.

5. A threaded member tightening method in which at least four threaded members are tightened by dividing the threaded members into sets of at least two and tightening each of the sets by a threaded member tightening method as defined in any one of claim 3 or claim 4.

6. A threaded member tightening method as defined in claim 5 wherein, in tightening four threaded members, the threaded members are divided into a set of two threaded members positioned diagonally and a set of two threaded members positioned diagonally reversely.

7. A threaded member tightening method as defined in claim 1 wherein the specified value for the amount of tightening is smaller than a proper value for the final amount of tightening, and wherein each threaded member is finally tightened to the proper value when the threaded member is judged to be properly tightened.

8. A threaded member tightening method as defined in claim 2 wherein the predetermined value for the tightening torque is smaller than a proper value for final tightening torque, and that each threaded member is tightened until the proper final torque value is reached when the threaded member is judged to be properly tightened.

9. A threaded member tightening method as defined in claim 2 including the step of discontinuing tightening of the threaded members upon the tightening torque of one of the threaded members exceeding the predetermined value before the amount of tightening of the threaded member reaches a specified lower limit.

10. A threaded member tightening method as defined in claim 9 including the step of discontinuing tightening of the threaded members when the tightening torque of one of the threaded members is below the predetermined value where the amount of tightening of the threaded member reaches a specified upper limit.

11. A threaded member tightening method in which tightening being effected in a plurality of divided steps each of which is executed by a threaded member tightening method as defined in any one of claim 1 or claim 2.

* * * * *